(12) United States Patent
Popov et al.

(10) Patent No.: US 12,280,743 B2
(45) Date of Patent: Apr. 22, 2025

(54) AUTOMOBILE WITH RACK IN THE CARGO SPACE

(71) Applicant: Ford Global Technologies, LLC, Dearborn, MI (US)

(72) Inventors: Ilya Popov, Aachen (DE); Hendrik Berger, Aachen (DE); Michael Herbert Oelscher, Bergheim (DE); Andreas Hegerath, Bergheim (DE); Marcel Grein, Geilenkirchen (DE); Jeroen Lem, Wittem (NL)

(73) Assignee: Ford Global Technologies, LLC, Dearborn, MI (US)

( * ) Notice: Subject to any disclaimer, the term of this patent is extended or adjusted under 35 U.S.C. 154(b) by 379 days.

(21) Appl. No.: 17/988,160

(22) Filed: Nov. 16, 2022

(65) Prior Publication Data

US 2023/0182643 A1 Jun. 15, 2023

(30) Foreign Application Priority Data

Dec. 15, 2021 (DE) .......................... 102021133322.9

(51) Int. Cl.
 *B60R 5/04* (2006.01)
 *B60R 5/00* (2006.01)
(52) U.S. Cl.
 CPC .............. *B60R 5/003* (2013.01); *B60R 5/041* (2013.01)
(58) Field of Classification Search
 CPC ................................ B60R 5/003; B60R 5/041
 USPC ....................................................... 296/37.5
 See application file for complete search history.

(56) References Cited

U.S. PATENT DOCUMENTS

| 3,300,056 | A | * | 1/1967 | Kaspar | A47B 55/02 |
| | | | | | 211/181.1 |
| 5,536,061 | A | | 7/1996 | Moore et al. | |
| 9,050,878 | B2 | | 6/2015 | Hendren et al. | |
| 10,507,754 | B2 | | 12/2019 | Ellis et al. | |
| 11,840,169 | B2 | * | 12/2023 | Seemüller | B60P 1/5442 |
| 2001/0031193 | A1 | * | 10/2001 | Chevrier | B60P 3/062 |
| | | | | | 414/537 |
| 2017/0291766 | A1 | * | 10/2017 | Orth | G06Q 10/0832 |
| 2022/0129832 | A1 | * | 4/2022 | Gil | G06Q 10/083 |

(Continued)

FOREIGN PATENT DOCUMENTS

| CN | 111347962 | A | * | 6/2020 |
| CN | 117124967 | A | * | 11/2023 |

(Continued)

*Primary Examiner* — Hilary L Gutman
(74) *Attorney, Agent, or Firm* — Vichit Chea; Price Heneveld LLP

(57) ABSTRACT

An automobile having a cargo space, a rear door opening for accessing the cargo space and a door pillar which delimits the rear door opening. The vehicle has a rack which in a stowed state is arranged entirely in the cargo space and is at least partially concealed by the door pillar as viewed from outside the automobile in the direction of the vehicle longitudinal axis of the automobile, and in a deployed state is arranged at least partially outside the cargo space. The vehicle has a transfer mechanism to transfer the rack between the stowed state and the deployed state via the rear door opening, wherein the transfer mechanism is configured such that, during a transfer of the rack from the stowed state into the deployed state, the rack moves inward in the direction of the vehicle transverse axis of the automobile.

13 Claims, 8 Drawing Sheets

(56) References Cited

U.S. PATENT DOCUMENTS

2024/0108130 A1* 4/2024 Lem .................. A47B 57/04
2024/0109495 A1* 4/2024 Grein ................. B60R 5/006

FOREIGN PATENT DOCUMENTS

| | | | | |
|---|---|---|---|---|
| CZ | 7078 U1 * | 4/1998 | | |
| DE | 8425105 U1 | 11/1984 | | |
| DE | 102016010687 A1 | 3/2018 | | |
| DE | 102016010689 A1 | 3/2018 | | |
| DE | 102017009731 A1 | 4/2019 | | |
| DE | 102019000895 A1 * | 8/2019 | | |
| DE | 102018001734 A1 | 9/2019 | | |
| DE | 102018219234 A1 * | 5/2020 | | |
| DE | 202020101069 U1 | 5/2020 | | |
| DE | 202020107424 U1 | 3/2021 | | |
| DE | 102020203083 B4 | 9/2021 | | |
| EP | 1059050 A2 * | 12/2000 | ............. | A47B 53/02 |
| FR | 2931861 A1 * | 12/2009 | ......... | E05D 15/1081 |
| GB | 470516 A * | 8/1937 | | |
| GB | 555026 A * | 7/1943 | | |
| GB | 2166091 A * | 4/1986 | ............... | B60P 3/14 |
| GB | 2581151 A * | 8/2020 | ............. | B60R 11/06 |
| JP | 2020203777 A * | 12/2020 | | |

* cited by examiner

AUTOMOBILE WITH RACK IN THE CARGO SPACE

CROSS-REFERENCE TO RELATED APPLICATION

This application claims foreign priority benefits under 35 U.S.C. § 119(a)-(d) to German Patent Application No. 102021133322.9 filed on Dec. 15, 2021, which is hereby incorporated by reference in its entirety.

FIELD OF THE DISCLOSURE

The present disclosure generally relates to motor vehicles, and more particularly relates to a vehicle having a transferable rack in the cargo space.

BACKGROUND OF THE DISCLOSURE

An automobile may be equipped with a rack in a cargo space of the automobile. This is for example relevant, if the automobile is used for making deliveries, in order to store packages, for example, in the rack. In another example, the automobile may be used by tradespersons, in order to store toolboxes, other equipment or building materials, for example, in the rack. The rack should in this case not be designed to be too small, in order that a sufficient number of articles, and also rather larger articles, can be stored in the rack. Furthermore, the rack should be arranged in the cargo space in the most space-saving manner possible, that is to say as far as possible no unusable gaps should be formed when the rack is installed in the cargo space.

The racks often may not be ergonomically accessible. For example, in some scenarios, a person may have to crouch in the cargo space in order to reach a compartment of the rack. It is furthermore conceivable that a cargo space floor of the automobile may be obstructed by articles, which further exacerbates the problem of ergonomic accessibility.

It would be desirable to provide an automobile having a rack which is accommodated in space-saving fashion in a cargo space of the automobile and which is ergonomically accessible.

SUMMARY OF THE DISCLOSURE

According to a first aspect of the present disclosure, an automobile is provided and includes a cargo space, a rear door opening via which the cargo space is accessible from outside the automobile, a door pillar which delimits the rear door opening, and a rack which in a stowed state is arranged entirely in the cargo space and is at least partially concealed by the door pillar as viewed from outside the automobile in a direction of a vehicle longitudinal axis of the automobile, and in a deployed state is arranged at least partially outside the cargo space. The automobile also includes a transfer mechanism configured to transfer the rack from the stowed state into the deployed state, and vice versa, via the rear door opening, wherein the transfer mechanism is configured such that, during a transfer of the rack from the stowed state into the deployed state, the rack moves inward in a direction of the vehicle transverse axis of the automobile.

According to a second aspect of the present disclosure, an automobile is provided and includes a cargo space, a rear door opening via which the cargo space is accessible from outside the automobile, a door pillar which delimits the rear door opening, and a rack which in a stowed state is arranged entirely in the cargo space and is at least partially concealed by the door pillar as viewed from outside the automobile in a direction of a vehicle longitudinal axis of the automobile, and in a deployed state is arranged at least partially outside the cargo space. The automobile also includes a transfer mechanism configured to transfer the rack from the stowed state into the deployed state, and vice versa, via the rear door opening, wherein the transfer mechanism is configured such that, during a transfer of the rack from the stowed state into the deployed state, the rack moves inward in a direction of the vehicle transverse axis of the automobile, wherein the transfer mechanism has a first guide and a first follower which is configured to move along the first guide. The first guide is arranged so as to be static relative to the cargo space and the first follower is fastened to the rack, or wherein the first guide is fastened to the rack and the first follower is arranged so as to be static relative to the cargo space. The transfer mechanism has a second guide and a second follower which is configured to move along the second guide and which is arranged spaced apart from the first follower in the direction of the vehicle longitudinal axis, wherein the second guide is arranged so as to be static relative to the cargo space and the second follower is fastened to the rack, or wherein the second guide is fastened to the rack and the second follower is arranged so as to be static relative to the cargo space. The first guide and the second guide are spatially separate from one another.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1:
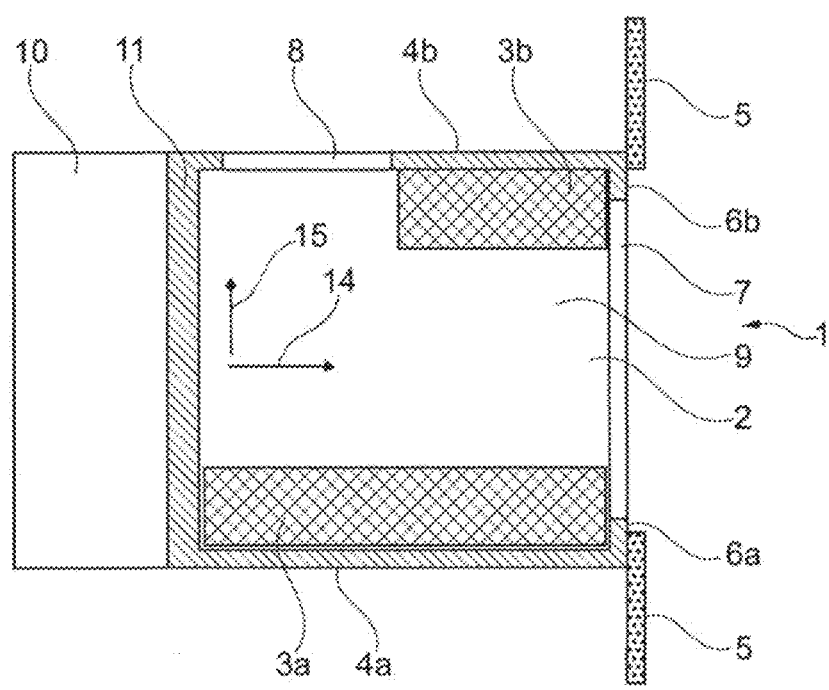
FIG. 1 is a top schematic view of a horizontal section through an automobile, according to one example with a rack in a stowed state.
Figure 2:
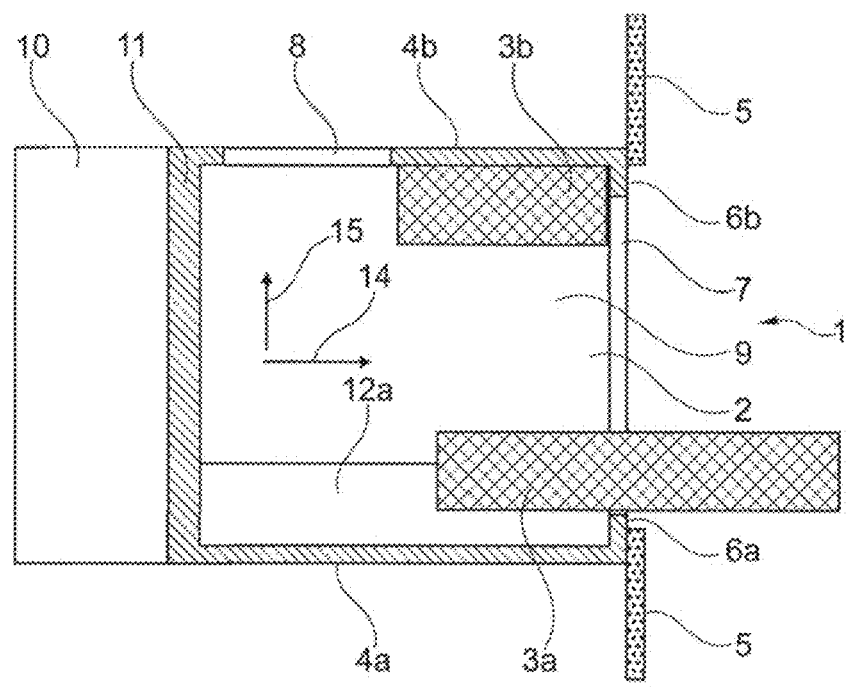
FIG. 2 is a top schematic view of the section from FIG. 1 with the rack in a deployed state.
Figure 3:
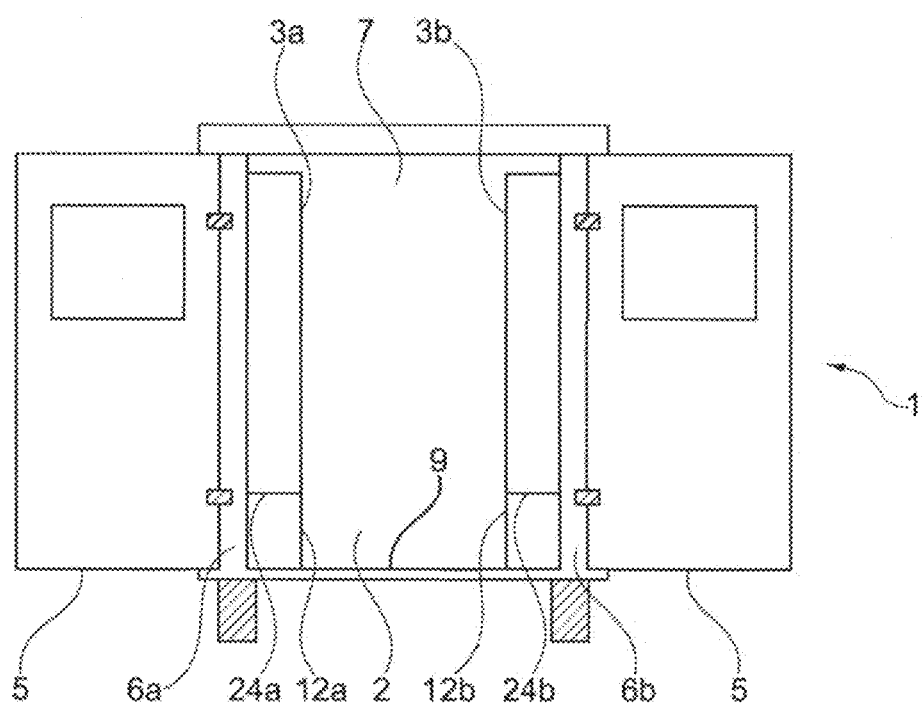
FIG. 3 is a rear plan view of the automobile showing the rear with the rack in the stowed state.

As can be seen from FIGS. 1-8, an automobile 1 or motor vehicle is illustrated having a cargo space 2, a rear door opening 7 via which the cargo space 2 is accessible from outside the automobile 1, and a door pillar 6a which delimits the rear door opening 7; in particular, the door pillar 6a delimits the rear door opening 7 in the direction of the vehicle transverse axis 15. The vehicle transverse axis 15 may be arranged perpendicular to the vehicle longitudinal axis 14 and may lie in a horizontal plane together with the vehicle longitudinal axis 14. The automobile 1 furthermore has a rack 3a which has a stowed state, in which the rack 3a is arranged entirely in the cargo space 2 and is at least partially concealed by the door pillar 6a as viewed from outside the automobile 1 in the direction of the vehicle longitudinal axis 14 of the automobile 1, and has a deployed state, in which the rack 3a is arranged at least partially outside the cargo space 2. It should be appreciated that the automobile 1 should be parked and not moving when the rack 3a is partially positioned outside the automobile 1. FIG. 3 shows a plan view of the automobile 1 from outside the automobile 1 in the direction of the vehicle longitudinal axis 14, wherein FIG. 3 shows particularly clearly that the rack 3a is partially concealed by the door pillar 6a. The automobile 1 furthermore has a transfer mechanism 25 that is used to transfer the rack 3a from the stowed state into the deployed state, and vice versa, via the rear door opening 7. The transfer mechanism 25 is configured such that, during a transfer of the rack 3a from the stowed state into the deployed state, the rack 3a moves inward in the direction of the vehicle transverse axis 15 of the automobile 1.

FIGS. 1 and 2 show that the automobile 1 may have a side wall 4a and a further side wall 4b that delimit the cargo space 2 at mutually opposite sides in the direction of the vehicle transverse axis 15 of the automobile 1. Here, in the stowed state, the rack 3a may be arranged closer to the side wall 4a than to the further side wall 4b. By virtue of the fact that the rack 3a moves inward during the transfer from the stowed state into the deployed state, the rack 3a moves further away from the side wall 4a, as shown in FIGS. 1 and 2. Furthermore, the automobile 1 may have a partition 11 that delimits the cargo space 2 at the front in the direction of the vehicle longitudinal axis 14. The automobile 1 may furthermore have a driver's cab 10, which is arranged on that side of the partition 11 which faces away from the cargo space 2.

The automobile 1 may have a rear door 5, by use of which the rear door opening 7 is closable. The rear door 5 may be mounted pivotably on the door pillar 6a. As an alternative to the pivotable mounting of the rear door 5, the rear door 5 may also be mounted in longitudinally displaceable fashion. The rear door 5 may, for example, be of two-leaf configuration, as illustrated in FIGS. 1-4. For this purpose, the automobile 1 may have a further door pillar 6b, wherein each of the two leaves is mounted pivotably on a respective one of the door pillar 6a and the further door pillar 6b.

Figure 5:
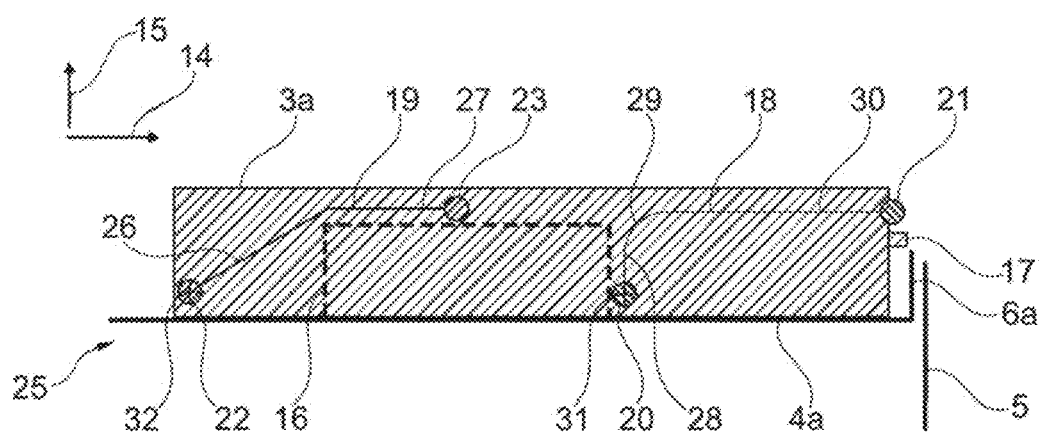
FIG. 5 is a schematic view of a transfer mechanism of the automobile at a first time.
Figure 6:
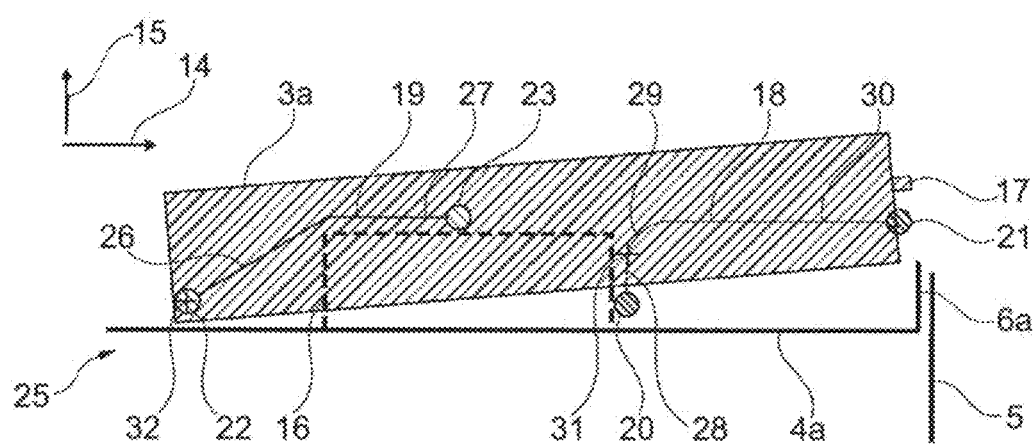
FIG. 6 is a schematic view of the transfer mechanism in FIG. 5 at a second time.
Figure 7:
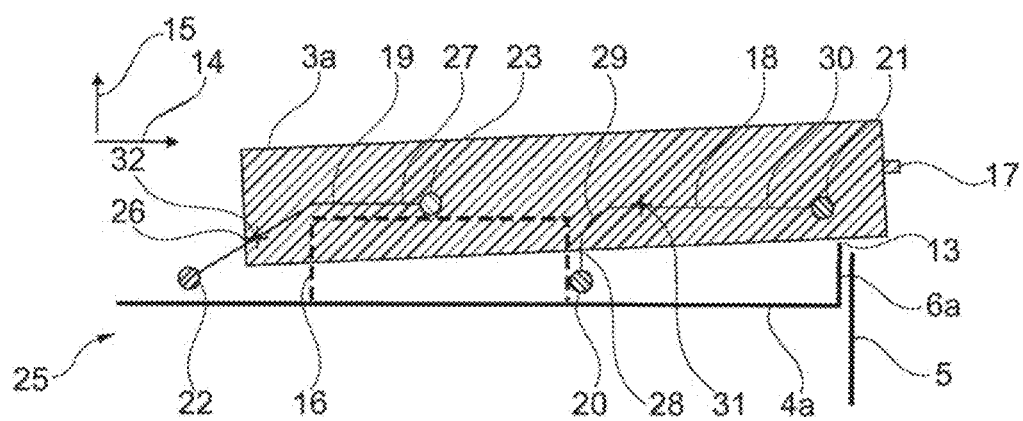
FIG. 7 is a schematic view of the transfer mechanism in FIG. 6 at a third time.
Figure 8:
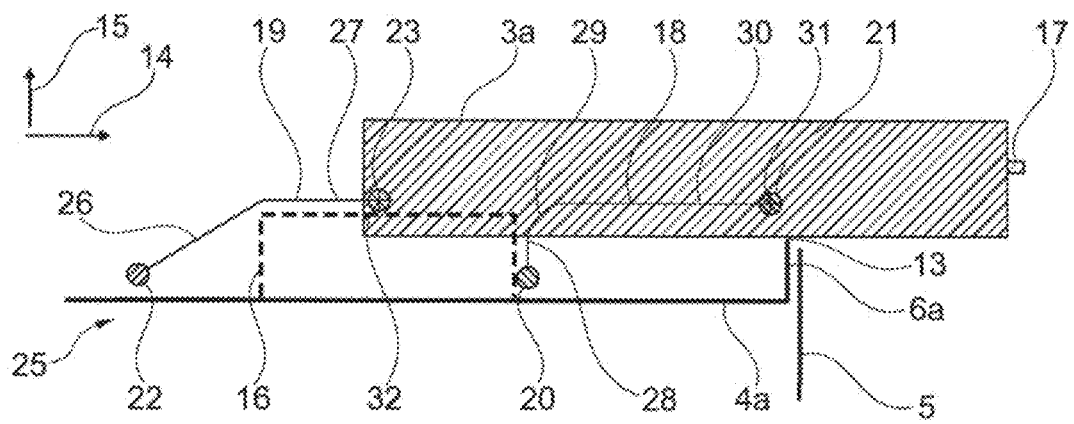
FIG. 8 is a schematic view of the transfer mechanism in FIG. 5 at a fourth time.

FIGS. 5-8 show the transfer mechanism 25 at four different times in a view from above, wherein FIG. 5 shows a first time, FIG. 6 shows a second time, FIG. 7 shows a third time and FIG. 8 shows a fourth time, wherein the time progresses from the first time to the fourth time. FIGS. 5-8 illustrate the situation in which the rack 3a is transferred from the stowed state, which is illustrated in FIG. 5, to the deployed state, which is illustrated in FIG. 8. FIG. 7 shows a partially deployed state.

The transfer mechanism 25 may have a first guide 18 and a first follower 31 that is configured to move along the first guide 18. FIGS. 5-8 illustrate a first situation for the first guide 18 and the first follower 31, wherein, in the first situation for the first guide 18 and the first follower 31, the first guide 18 is arranged so as to be static relative to the cargo space 2 and the first follower 31 is fastened to the rack 3a. Alternatively, in a second situation for the first guide and the first follower, it is conceivable for the first guide be fastened to the rack 3a and for the first follower to be arranged so as to be static relative to the cargo space 2. In the second situation for the first guide and the first follower, the first guide could, for example, be designed so as to be point-symmetrical with respect to the first guide 18 illustrated in FIGS. 5-8.

Furthermore, the displacement mechanism 25 may have a second guide 19 and a second follower 32 which is configured to move along the second guide 19 and which is arranged spaced apart from the first follower 31 in the direction of the vehicle longitudinal axis 14. FIGS. 5-8 illustrate a first situation for the second guide 19 and the second follower 32, wherein, in the first situation for the second guide 19 and the second follower 32, the second guide is arranged so as to be static relative to the cargo space 2 and the second follower 32 is fastened to the rack 3a. Alternatively, in a second situation for the second guide and the second follower, it is conceivable for the second guide be fastened to the rack 3a and for the second follower to be arranged so as to be static relative to the cargo space 2. In the second situation for the second guide and the second follower, the second guide could for example be designed so as to be point-symmetrical with respect to the second guide 19 illustrated in FIGS. 5-8.

For example, the first guide 18 may have a rail, and the first follower 31 may have a slider that is configured to slide on the rail or may have a wheel that is configured to roll on the rail. In another example, the first guide 18 may have a guide slot, and the first follower 31 may have a slide block that is configured to slide in the guide slot or may have a wheel that is configured to roll in the guide slot. For example, the second guide 19 may have a rail, and the second follower 32 may have a slider that is configured to slide on the rail or may have a wheel that is configured to roll on the rail. In another example, the second guide 19 may have a guide slot, and the second follower 32 may have a slide block that is configured to slide in the guide slot or may have a wheel that is configured to roll in the guide slot.

The first guide 18 and the second guide 19 may be spatially separate from one another as shown in the example. It is alternatively conceivable for the first guide 18 and the second guide 19 not to be spatially separate from one another, for example, by virtue of the first guide 18 and the second guide 19 being formed by a single rail or a single guide slot.

The first guide 18 may have a starting point 20 of the first guide 18 and an end point 21 of the first guide 18, wherein, in the stowed state, the first follower 31 is arranged at the starting point 20 of the first guide 18 and, in the deployed state, the first follower is arranged at the end point 21 of the first guide 18, wherein the first guide 18 defines a trajectory of the first follower 31 from the starting point 20 of the first guide 18 to the end point 21 of the first guide 18. In the first situation for the first guide 18 and the first follower 31 (in which the first follower 31 is fastened to the rack 3a, in particular is fastened so as to be static relative to the rack 3a), the trajectory of the first follower 31 describes a movement of the first follower 31 relative to the cargo space 2. The trajectory of the first follower 31 corresponds to the line plotted in FIGS. 5-8 which connects the starting point 20 of the first guide 18 and the end point 21 of the first guide 18 to one another. In the second situation for the first guide 18 and the first follower 31 (in which the first follower 31 is arranged so as to be static relative to the cargo space 2), the trajectory of the first follower 31 describes a movement of the first follower 31 relative to the rack 3a.

The trajectory of the first follower 31 may have a transverse portion 28 that causes the rack 3a to move away from the side wall 4a, or toward the side wall 4a, with a movement component in the direction of the vehicle transverse axis 15. Furthermore, the trajectory of the first follower 31 may have a longitudinal portion 30 which is arranged between the transverse portion 28 and the end point 21 of the first guide 18 along the trajectory of the first follower 31 and which causes the rack 3a to move out of or into the cargo space 2 with a movement component in the direction of the vehicle longitudinal axis 14. The transverse portion 28 and the longitudinal portion 30 may have different inclinations with respect to the vehicle longitudinal axis 14. Furthermore, the transverse portion 28 and the longitudinal portion 30 may be straight. For example, the transverse portion 28 may enclose a third angle of at most 45°, in particular of at most 30° or at most 20°, with the vehicle transverse axis 15. The longitudinal portion 30 may enclose a fourth angle of at most 45°, in particular of at most 20° or at most 10°, with the vehicle longitudinal axis 14. The transverse portion 28 may directly adjoin the starting point 20 of the first guide 18. The longitudinal portion 30 may directly adjoin the end point 21 of the first guide 18.

The trajectory of the first follower 31 may have a curve portion 29 which is of curved design and which is arranged between the transverse portion 28 and the longitudinal portion 30 along the trajectory of the first follower 31. In particular, the curve portion 29 may directly adjoin the transverse portion 28 and directly adjoin the longitudinal portion 30.

The second guide 19 may have a starting point 22 of the second guide 19 and an end point 23 of the second guide 19, wherein, in the stowed state, the second follower 32 is arranged at the starting point 22 of the second guide 19 and, in the deployed state, the second follower is arranged at the end point 23 of the second guide 19, wherein the second guide 19 defines a trajectory of the second follower 32 from the starting point 22 of the second guide 19 to the end point 23 of the second guide 19. In the first situation for the second guide 19 and the second follower 32 (in which the second follower 32 is fastened to the rack 3a, in particular is fastened so as to be static relative to the rack 3a), the trajectory of the second follower 32 describes a movement of the second follower 32 relative to the cargo space 2. The trajectory of the second follower 32 corresponds to the line plotted in FIGS. 5-8 which connects the starting point 22 of the second guide 19 and the end point 23 of the second guide 19 to one another. In the second situation for the second guide 19 and the second follower 32 (in which the second follower 32 is arranged so as to be static relative to the cargo space 2), the trajectory of the second follower 32 describes a movement of the second follower 32 relative to the rack 3a.

The trajectory of the second follower 32 may have a first portion 26 that causes the rack 3a to move away from the side wall 4a, or toward the side wall 4a, with a movement component in the direction of the vehicle transverse axis 15. Furthermore, the trajectory of the second follower 32 may have a second portion 27 which is arranged between the first portion 26 and the end point 23 of the second guide 19 along the trajectory of the second follower 32 and which causes the rack 3a to move out of or into the cargo space 2 with a movement component in the direction of the vehicle longitudinal axis 14. The first portion 26 and the second portion 27 may have different inclinations with respect to the vehicle longitudinal axis 14. In particular, the angle of the first portion 26 with respect to the vehicle longitudinal axis 14 is greater than the angle of the second portion 27 with respect to the vehicle longitudinal axis 14. Furthermore, the first portion 26 and the second portion 27 may be straight. The first portion 26 may enclose a first angle of 0° to 80° with the vehicle transverse axis 15. The first angle may be greater than 0°, in particular greater than 5°. In particular, the first angle ranges from 30° to 70°. The second portion 27 may enclose a second angle of at most 45°, in particular of at most 30° or at most 20°, with the vehicle longitudinal axis 14.

In the specific embodiment in FIGS. 5-8, the transfer of the rack 3a from the stowed state into the deployed state can be described as follows: At the first time, the rack 3a is arranged in the stowed state, and the first follower 31 is arranged at the starting point 20 of the first guide 18 and the second follower 32 is arranged at the starting point 22 of the second guide 19. At the second time, the first follower 31 has moved away from the starting point 20 of the first guide 18 and is situated in the transverse portion 28 or the curve portion 29. Because the transverse portion 28 encloses an angle of 0° with the vehicle transverse axis 15, this has had the effect that the second follower 32 has performed only a short translational movement and has rotated about its own axis. At the third time, the rack 3a is in the partially deployed state and is thus arranged partially outside the cargo space 2. The rack 3a and the door pillar 6a delimit a gap 13 at opposite sides in the direction of the vehicle transverse axis 15 (see also FIG. 3), such that the rack 3a can move out of the cargo space 2 without colliding. The first follower 31 is situated in the curve portion 29 or in the longitudinal portion 30. The second follower 32 has now moved a significant distance away from the starting point 22 of the second guide 19 and is situated in the first portion 26 or in the second portion 27. At the fourth time, the rack 3a is arranged in the deployed state, in which the first follower 31 is arranged at the end point 21 of the first guide 18 and the second follower 32 is arranged at the end point 23 of the second guide 19.

It is conceivable for the starting point 20 of the first guide 18 and/or the end point 21 of the first guide 18 to have a stop for the first follower 31. The transfer of the rack 3a can thus be delimited. It is alternatively or additionally conceivable for the starting point 22 of the second guide 19 and/or the end point 23 of the second guide 19 to have a stop for the second follower 32.

Figure 4:
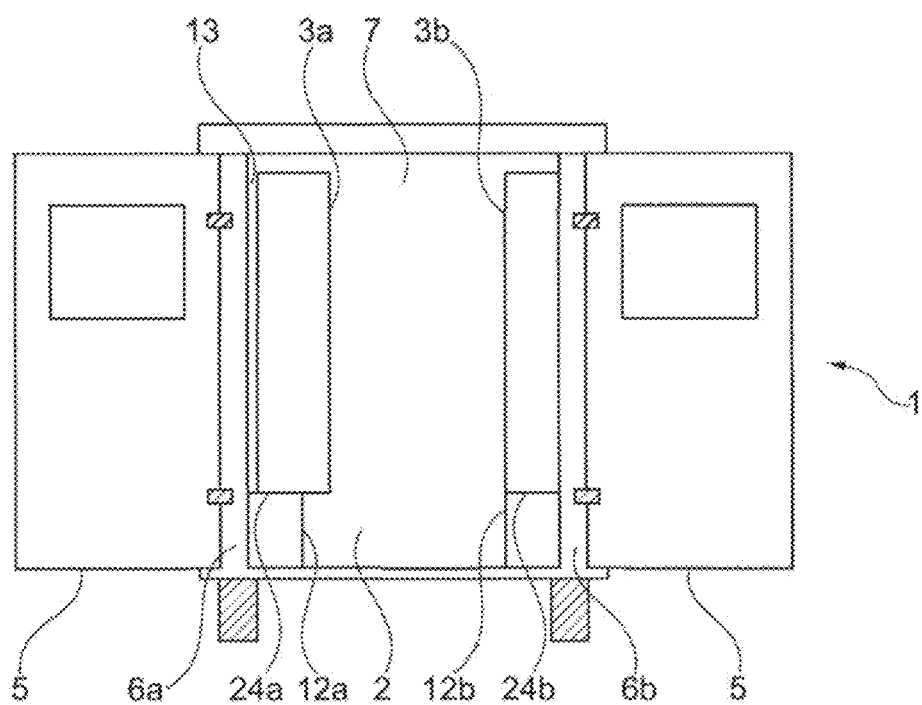
FIG. 4 is a rear plan view from FIG. 3 with the rack illustrated in the deployed state.

FIGS. 3 and 4 show that the automobile 1 may have a cargo space floor 9 that downwardly delimits the cargo space 2, and the rack 3a may have a bottom end 24a of the rack 3a, wherein the bottom end 24a of the rack 3a is arranged spaced apart from the cargo space floor 9. For example, a spacing from the bottom end 24a of the rack 3a to the cargo space floor 9 may be at least 10 cm or at least 20 cm. The bottom end 24a of the rack 3a may be arranged above a wheel housing 16 that delimits the cargo space 2. In particular, the rack 3a is situated above the wheel housing 16 when in the stowed state. The wheel housing 16 is indicated by the dashed rectangle in FIGS. 5-8.

The automobile 1 may have a rack base 12a that is supported on the cargo space floor 9. The rack 3a may be supported on the cargo space floor 9.

The automobile 1 may have a locking device that is configured to lock the rack 3a in the stowed state so as to prevent a transfer by use of the transfer mechanism 25.

The automobile may have a motor, in particular an electric motor, which is configured to transfer the rack 3a from the stowed state into the deployed state, and vice versa.

FIGS. 5-8 show that the rack 3a may have a handle 17 which forms a rear end of the rack 3a in the direction of the vehicle longitudinal axis 14.

The automobile 1 may, for example, be a van or a truck or other motor vehicle configured having a cargo space.

The first guide 18 and the first follower 31 may for example be arranged at a lower side of the rack 3a, and in particular, the second guide 19 and the second follower 32 may be arranged at the lower side of the rack 3a or arranged at an upper side of the rack 3*a*. In another example, the first guide 18 and the first follower 32 may be arranged at an upper side of the rack 3*a*, and in particular, the second guide 19 and the second follower 32 may be arranged at a lower side of the rack 3*a* or arranged at the upper side of the rack 3*a*.

It is also conceivable for the first guide 18 and the first follower 31 to be arranged at a lower side of the rack 3*a* and for the transfer mechanism 25 to have a further first guide and a further first follower, which are arranged at an upper side of the rack 3*a*. The first guide 18 and the further first guide may for example be mirror-symmetrical with respect to one another about a horizontal plane. It is furthermore conceivable for the second guide 19 and the second follower 32 to be arranged at a lower side of the rack 3*a* and for the transfer mechanism 25 to have a further second guide and a further second follower, which are arranged at an upper side of the rack 3*a*. The second guide 19 and the further second guide may, for example, be mirror-symmetrical with respect to one another about a horizontal plane.

FIGS. 1-4 illustrate that the automobile 1 may have a further door pillar 6*b* which delimits the rear door opening 7, a further rack 3*b* having a bottom end 24*b* and a stowed state, in which the further rack 3*b* is arranged entirely in the cargo space 2 and is at least partially concealed by the further door pillar 6*b* as viewed from outside the automobile 1 in the direction of the vehicle longitudinal axis 14 of the automobile 1, and has a deployed state, in which the further rack 3*b* is arranged at least partially outside the cargo space 2, and a further transfer mechanism by use of which the further rack 3*b* can be transferred from the stowed state into the deployed state, and vice versa, via the rear door opening 7. The further transfer mechanism is configured such that, during a transfer of the further rack 3*b* from the stowed state into the deployed state, the further rack 3*b* moves inward in the direction of the vehicle transverse axis 15 of the automobile 1. This may mean that the further rack 3*b* is arranged closer to the further side wall 4*b* than to the side wall 4*a* and moves further away from the further side wall 4*b*. The transfer mechanism 25 and the further transfer mechanism may be of analogous construction. For example, the transfer mechanism 25 and the further transfer mechanism may be mirror-symmetrical about a plane, the normal to which is arranged parallel to the vehicle transverse axis 15. The further rack 3*b* may be shorter than the rack 3*a* in the direction of the vehicle longitudinal axis 14. This is, for example, relevant if, as illustrated in FIGS. 1 and 2, a side door opening 8 is arranged in the further side wall 4*b*. In this case, it is conceivable for the further transfer mechanism to be mirror-symmetrical about a plane, the normal to which is arranged parallel to the vehicle transverse axis 15, but to be of shortened design in relation to the transfer mechanism.

The automobile 1 may furthermore have a further rack base 12*b* that is supported on the cargo space floor 9, wherein the further rack 3*b* is supported on the further rack base 12*b*.

The automobile according to the disclosure has a cargo space, a rear door opening, a door pillar, a rack and a transfer mechanism. The cargo space is accessible from outside the automobile via the rear door opening. The door pillar delimits the rear door opening. The rack has a stowed state, in which the rack is arranged entirely in the cargo space and is at least partially concealed by the door pillar as viewed from outside the automobile in the direction of the vehicle longitudinal axis of the automobile, and has a deployed state, in which the rack is arranged at least partially outside the cargo space. By using the transfer mechanism, the rack can be transferred from the stowed state into the deployed state and vice versa via the rear door opening, wherein the transfer mechanism is configured such that, during a transfer of the rack from the stowed state into the deployed state, the rack moves inward in the direction of the vehicle transverse axis of the automobile.

By virtue of the fact that the rack has arranged at least partially outside the cargo space in the deployed state, the rack is ergonomically accessible from outside the automobile in the deployed state. It is not necessary to enter the cargo space in order to reach a compartment of the rack. By virtue of the fact that the rack is at least partially concealed by the door pillar in the stowed state, the rack can be accommodated in space-saving fashion in the cargo space. By use of the transfer mechanism, it is possible for the rack to move inward in the direction of the vehicle transverse axis, and thus subsequently move past the door pillar to the outside.

The automobile may, for example, be a van and/or a truck or other motor vehicle having a cargo space.

The transfer mechanism has a first guide and a first follower which is configured to move along the first guide, wherein the first guide is arranged so as to be static relative to the cargo space and the first follower is fastened to the rack, or wherein the first guide is fastened to the rack and the first follower is arranged so as to be static relative to the cargo space. The transfer mechanism has a second guide and a second follower which is configured to move along the second guide and which is arranged spaced apart from the first follower in the direction of the vehicle longitudinal axis, wherein the second guide is arranged so as to be static relative to the cargo space and the second follower is fastened to the rack, or wherein the second guide is fastened to the rack and the second follower is arranged so as to be static relative to the cargo space. By virtue of the first follower and the second follower being arranged spaced apart from one another, it is possible for a form of a trajectory of the first follower to differ from a form of a trajectory of the second follower during the transfer of the rack. This yields great flexibility for the configuration of a movement of the rack for the transfer from the stowed state into the deployed state, and vice versa.

The first guide and the second guide are spatially separate from one another. The flexibility for the configuration of the movement of the rack can thus be yet further increased.

The second guide has a starting point of the second guide and an end point of the second guide, wherein, in the stowed state, the second follower is arranged at the starting point of the second guide and, in the deployed state, said second follower is arranged at the end point of the second guide, wherein the second guide defines a trajectory of the second follower from the starting point of the second guide to the end point of the second guide, wherein the trajectory of the second follower has a first portion that encloses a first angle of about 0° to 80° with the vehicle transverse axis. It is thus achieved that the rack, in a region of the second follower, moves radially inward during the transfer from the stowed state into the deployed state. According to one embodiment, the first angle is particularly preferably greater than 0°, in particular greater than 5°. It is thus achieved that the rack moves both radially inward, and in the direction of the rear door opening, in the region of the second follower. According to an exemplary embodiment, the first angle ranges from 30° to 70°.

The trajectory of the second follower preferably has a second portion which is arranged between the first portion and the end point of the second guide along the trajectory of the second follower and which encloses a second angle of at most 45° with the vehicle longitudinal axis. It is thus achieved that the rack, in a region of the second follower, moves in the direction of the rear opening during the transfer from the stowed state into the deployed state. According to one embodiment, the first portion and the second portion each enclose a different angle with the vehicle longitudinal axis. According to more specific embodiments, the second angle is at most 30°, and more particularly at most 20°.

The first guide has a starting point of the first guide and an end point of the first guide, wherein, in the stowed state, the first follower is arranged at the starting point of the first guide and, in the deployed state, said first follower is arranged at the end point of the first guide, wherein the first guide defines a trajectory of the first follower from the starting point of the first guide to the end point of the first guide, wherein the trajectory of the first follower has a transverse portion that encloses a third angle of at most 45° with the vehicle transverse axis. It is thus achieved that the rack, in a region of the first follower, moves radially inward during the transfer from the stowed state into the deployed state. In one example, the third angle is at most 30°, and more particularly at most 20°.

The trajectory of the first follower preferably has a longitudinal portion which is arranged between the transverse portion and the end point of the first guide along the trajectory of the first follower and which encloses a fourth angle of at most 45° with the vehicle longitudinal axis. It is thus achieved that the rack, in a region of the first follower, moves in the direction of the rear opening during the transfer from the stowed state into the deployed state. In one embodiment, the transverse portion and the longitudinal portion each enclose a different angle with the vehicle longitudinal axis. According to more specific embodiments, the fourth angle is at most 20°, and more particularly at most 10°.

The trajectory of the first follower preferably has a curve portion which is of curved design and which is arranged between the transverse portion and the longitudinal portion along the trajectory of the first follower. A smooth transition from the transverse portion to the longitudinal portion is thus created.

The first guide has a rail, and the first follower has a slider that is configured to slide on the rail or has a wheel that is configured to roll on the rail, or if the first guide has a guide slot, and the first follower has a slide block that is configured to slide in the guide slot or has a wheel that is configured to roll in the guide slot. The second guide has a rail, and the second follower has a slider that is configured to slide on the rail or has a wheel that is configured to roll on the rail, or if the second guide has a guide slot, and the second follower has a slide block that is configured to slide in the guide slot or has a wheel that is configured to roll in the guide slot.

The automobile or motor vehicle has a cargo space floor that downwardly delimits the cargo space, and the rack has a bottom end of the rack, wherein the bottom end of the rack is arranged spaced apart from the cargo space floor. If the transfer mechanism is arranged at the bottom on the rack, contamination of the transfer mechanism is thus advantageously less likely. It is thus also possible, if articles are arranged on the cargo space floor, for the rack to be transferred over said articles. A spacing from the bottom end of the rack to the cargo space floor is particularly preferably at least 10 cm or at least 20 cm. The bottom end of the rack may be arranged above a wheel housing that delimits the cargo space.

The transfer mechanism may be arranged directly adjacent to the cargo space floor or may be arranged spaced apart from the cargo space floor, for example with a spacing of at least 10 cm or at least 20 cm.

The automobile preferably has a locking device that is configured to lock the rack in the stowed state so as to prevent a transfer by the transfer mechanism. For example, the locking mechanism may have a longitudinally movable bolt and a cutout, wherein the bolt must be longitudinally moved, and thus introduced into the cutout, in order to impart a locking action. The bolt may be arranged in longitudinally movable fashion on the rack, and the cutout may be arranged so as to be static with respect to the cargo space. Alternatively, the bolt may be arranged in longitudinally movable fashion on a wall that delimits the cargo space, and the cutout may be arranged in static fashion on the rack.

In one embodiment, the automobile has a motor that is configured to transfer the rack from the stowed state into the deployed state and vice versa. The motor may be an electric motor. As an alternative or in addition to the provision of the motor, the rack and the transfer mechanism may be configured to be manually transferred from the stowed state to the deployed state, and vice versa.

The rack may have a handle. The rack can thus be easily gripped using a hand in order to transfer said rack from the stowed state into the deployed state, and vice versa. The handle particularly may form a rear end of the rack in the direction of the vehicle longitudinal axis.

The automobile has a further door pillar in the embodiment shown which delimits the rear door opening, a further rack which has a stowed state, in which the further rack is arranged entirely in the cargo space and is at least partially concealed by the further door pillar as viewed from outside the automobile in the direction of the vehicle longitudinal axis of the automobile, and has a deployed state, in which the further rack is arranged at least partially outside the cargo space, and a further transfer mechanism by which the further rack can be transferred from the stowed state into the deployed state, and vice versa, via the rear door opening, wherein the further transfer mechanism is configured such that, during a transfer of the further rack from the stowed state into the deployed state, the further rack moves inward in the direction of the vehicle transverse axis of the automobile.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. An automobile comprising:
   a cargo space;
   a rear door opening via which the cargo space is accessible from outside the automobile;
   a door pillar which delimits the rear door opening;
   a rack which in a stowed state is arranged entirely in the cargo space and is at least partially concealed by the door pillar as viewed from outside the automobile in a direction of a vehicle longitudinal axis of the automobile, and in a deployed state is arranged at least partially outside the cargo space; and
   a transfer mechanism configured to transfer the rack from the stowed state into the deployed state, and vice versa, via the rear door opening, wherein the transfer mechanism is configured such that, during a transfer of the rack from the stowed state into the deployed state, the rack moves inward in a direction of the vehicle transverse axis of the automobile, wherein the transfer mechanism has a first guide and a first follower which is configured to move along the first guide, wherein the first guide is arranged so as to be static relative to the cargo space and the first follower is fastened to the rack, or wherein the first guide is fastened to the rack and the first follower is arranged so as to be static relative to the cargo space, wherein the first guide has a starting point of the first guide and an end point of the first guide, wherein, in the stowed state, the first follower is arranged at the starting point of the first guide and, in the deployed state, the first follower is arranged at the end point of the first guide, wherein the first guide defines a trajectory of the first follower from the starting point of the first guide to the end point of the first guide, wherein the trajectory of the first follower has a transverse portion that encloses a third angle of at most 45° with the vehicle transverse axis, wherein the trajectory of the first follower has a longitudinal portion which is arranged between the transverse portion and the end point of the first guide along the trajectory of the first follower and which encloses a fourth angle of at most 45° with the vehicle longitudinal axis, and wherein the trajectory of the first follower has a curvature portion arranged between the transverse portion and the longitudinal portion along the trajectory of the first follower.

2. The automobile according to claim 1, wherein the transfer mechanism has a second guide and a second follower which is configured to move along the second guide and which is arranged spaced apart from the first follower in the direction of the vehicle longitudinal axis, wherein the second guide is arranged so as to be static relative to the cargo space and the second follower is fastened to the rack, or wherein the second guide is fastened to the rack and the second follower is arranged so as to be static relative to the cargo space.

3. The automobile according to claim 2, wherein the first guide and the second guide are spatially separate from one another.

4. The automobile according to claim 3, wherein the second guide has a starting point of the second guide and an end point of the second guide, wherein, in the stowed state, the second follower is arranged at the starting point of the second guide and, in the deployed state, the second follower is arranged at the end point of the second guide, wherein the second guide defines a trajectory of the second follower from the starting point of the second guide to the end point of the second guide, wherein the trajectory of the second follower has a first portion that encloses a first angle of 0° to 80° with the vehicle transverse axis.

5. The automobile according to claim 1, wherein the first guide has a rail, and the first follower has a slider configured to slide on the rail or has a wheel configured to roll on the rail, or wherein the first guide has a guide slot, and the first follower has a slide block configured to slide in the guide slot or has a wheel configured to roll in the guide slot.

6. The automobile according to claim 2, wherein the second guide has a rail, and the second follower has a slider configured to slide on the rail or has a wheel configured to roll on the rail, or wherein the second guide has a guide slot, and the second follower has a slide block configured to slide in the guide slot or has a wheel configured to roll in the guide slot.

7. The automobile according to claim 1, wherein the automobile has a cargo space floor that downwardly delimits the cargo space, and the rack has a bottom end of the rack, wherein the bottom end of the rack is arranged spaced apart from the cargo space floor.

8. The automobile according to claim 7, wherein the bottom end of the rack is arranged above a wheel housing that delimits the cargo space.

9. The automobile according to claim 1, wherein the automobile has a locking device configured to lock the rack in the stowed state to prevent a transfer by the transfer mechanism.

10. The automobile according to claim 1, wherein the rack has a handle.

11. The automobile according to claim 10, wherein the handle forms a rear end of the rack in the direction of the vehicle longitudinal axis.

12. The automobile according to claim 1, wherein the automobile has a further door pillar which delimits the rear door opening, a further rack which in a stowed state is arranged entirely in the cargo space and is at least partially concealed by the further door pillar as viewed from outside the automobile in the direction of the vehicle longitudinal axis of the automobile, and in a deployed state is arranged at least partially outside the cargo space, and a further transfer mechanism which transfers the further rack from the stowed state into the deployed state and vice versa via the rear door opening, wherein the further transfer mechanism is configured such that, during a transfer of the further rack from the stowed state into the deployed state, the further rack moves inward in the direction of the vehicle transverse axis of the automobile.

13. An automobile comprising:
a cargo space;
a rear door opening via which the cargo space is accessible from outside the automobile;
a door pillar which delimits the rear door opening;
a rack which in a stowed state is arranged entirely in the cargo space and is at least partially concealed by the door pillar as viewed from outside the automobile in a direction of a vehicle longitudinal axis of the automobile, and in a deployed state is arranged at least partially outside the cargo space; and
a transfer mechanism configured to transfer the rack from the stowed state into the deployed state, and vice versa, via the rear door opening, wherein the transfer mechanism is configured such that, during a transfer of the rack from the stowed state into the deployed state, the rack moves inward in a direction of the vehicle transverse axis of the automobile, wherein the transfer mechanism has a first guide and a first follower which is configured to move along the first guide, wherein the first guide is arranged so as to be static relative to the cargo space and the first follower is fastened to the rack, or wherein the first guide is fastened to the rack and the first follower is arranged so as to be static relative to the cargo space, wherein the transfer mechanism has a second guide and a second follower which is configured to move along the second guide and which is arranged spaced apart from the first follower in the direction of the vehicle longitudinal axis, wherein the second guide is arranged so as to be static relative to the cargo space and the second follower is fastened to the rack, or wherein the second guide is fastened to the rack and the second follower is arranged so as to be static relative to the cargo space, and wherein the first guide and the second guide are spatially separate from one another, wherein the second guide has a starting point of the second guide and an end point of the second guide, wherein, in the stowed state, the second follower is arranged at the starting point of the second guide and, in the deployed state, the second follower is arranged at the end point of the second guide, wherein the second guide defines a trajectory of the second follower from the starting point of the second guide to the end point of the second guide, wherein the trajectory of the second follower has a first portion that encloses a first angle of 0° to 80° with the vehicle transverse axis, wherein the trajectory of the second follower has a second portion arranged between the first portion and the end point of the second guide along the trajectory of the second follower and which encloses a second angle of at most 45° with the vehicle longitudinal axis, wherein the first guide has a starting point of the first guide and an end point of the first guide, wherein, in the stowed state, the first follower is arranged at the starting point of the first guide and, in the deployed state, the first follower is arranged at the end point of the first guide, wherein the first guide defines a trajectory of the first follower from the starting point of the first guide to the end point of the first guide, wherein the trajectory of the first follower has a transverse portion that encloses a third angle of at most 45° with the vehicle transverse axis, wherein the trajectory of the first follower has a longitudinal portion which is arranged between the transverse portion and the end point of the first guide along the trajectory of the first follower and which encloses a fourth angle of at most 45° with the vehicle longitudinal axis, and wherein the trajectory of the first follower has a curvature portion arranged between the transverse portion and the longitudinal portion along the trajectory of the first follower.

* * * * *